(12) United States Patent
Scythes et al.

(10) Patent No.: US 10,002,375 B1
(45) Date of Patent: Jun. 19, 2018

(54) HASHTAG SHOPPING AND RATING

(71) Applicant: Amazon Technologies, Inc., Reno, NV (US)

(72) Inventors: James Wallace Scythes, Seattle, WA (US); Rhys Brooks Trammell, Seattle, WA (US); Melissa Naarden Burdick, Seattle, WA (US); Chrystal Kalini Stansell, Seattle, WA (US); Jeremiah Lee Morgan, Seattle, WA (US); Alexander Martin Chamas, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 964 days.

(21) Appl. No.: 14/300,764

(22) Filed: Jun. 10, 2014

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0623* (2013.01); *G06Q 30/0282* (2013.01)

(58) Field of Classification Search
CPC .............................. G06Q 30/06; G06F 17/30
USPC ....................................................... 705/26.1
See application file for complete search history.

(56) References Cited

U.S. PATENT DOCUMENTS

| | | | |
|---|---|---|---|
| 2008/0091571 A1* | 4/2008 | Sater ................... | G06Q 30/0621 705/26.3 |
| 2008/0168055 A1* | 7/2008 | Rinearson ......... | G06F 17/30997 |
| 2009/0222759 A1* | 9/2009 | Drieschner ....... | G06F 17/30864 715/780 |
| 2012/0110508 A1* | 5/2012 | Bullen ................ | G06Q 10/06 715/825 |
| 2012/0203764 A1* | 8/2012 | Wood ................ | G06F 17/30247 707/722 |
| 2014/0150029 A1* | 5/2014 | Avedissian ......... | G06Q 30/0261 725/60 |

* cited by examiner

*Primary Examiner* — Mila Airapetian
(74) *Attorney, Agent, or Firm* — Kilpatrick Townsend & Stockton LLP

(57) ABSTRACT

Users of an electronic marketplace may be provided with an interface to suggest associating one or more tag identifiers, such as a hashtag identifier, with items that are offered for sale. Records associating the suggested tag identifiers and items for sale may be stored, and searched by other users, in order to provide purchase recommendations, which may not otherwise be available using product-descriptive searches. For example, tag identifiers may be used to associate products and/or services with events, such as a particular birthday or anniversary, and users can easily search for items based on intuitive tag identifiers, such as #8thbirthday, #10thanniversary, #firsttimedad, etc. The associations between the items and the tag identifiers may be dynamically updated based on various factors.

12 Claims, 10 Drawing Sheets

HASHTAG SHOPPING AND RATING

BACKGROUND

In the field of e-commerce, consumers may browse and purchase a wide variety of products via web pages or mobile applications provided by online merchants. In many circumstances, a user can visit the Web site of a Web merchant (or a "Web store") or other electronic marketplace that sells one or more items. Once there, the user can search for and view information about the items, give an instruction to place an order for one or more items, and provide information needed to complete the purchase (e.g., payment and shipping information). Some websites also provide users with purchase recommendations, such as when a user performs a search for a particular type of product, or places an item in a "shopping cart" for purchase.

BRIEF DESCRIPTION OF THE DRAWINGS

Various embodiments in accordance with the present disclosure will be described with reference to the drawings, in which.

DETAILED DESCRIPTION

Figure 1:
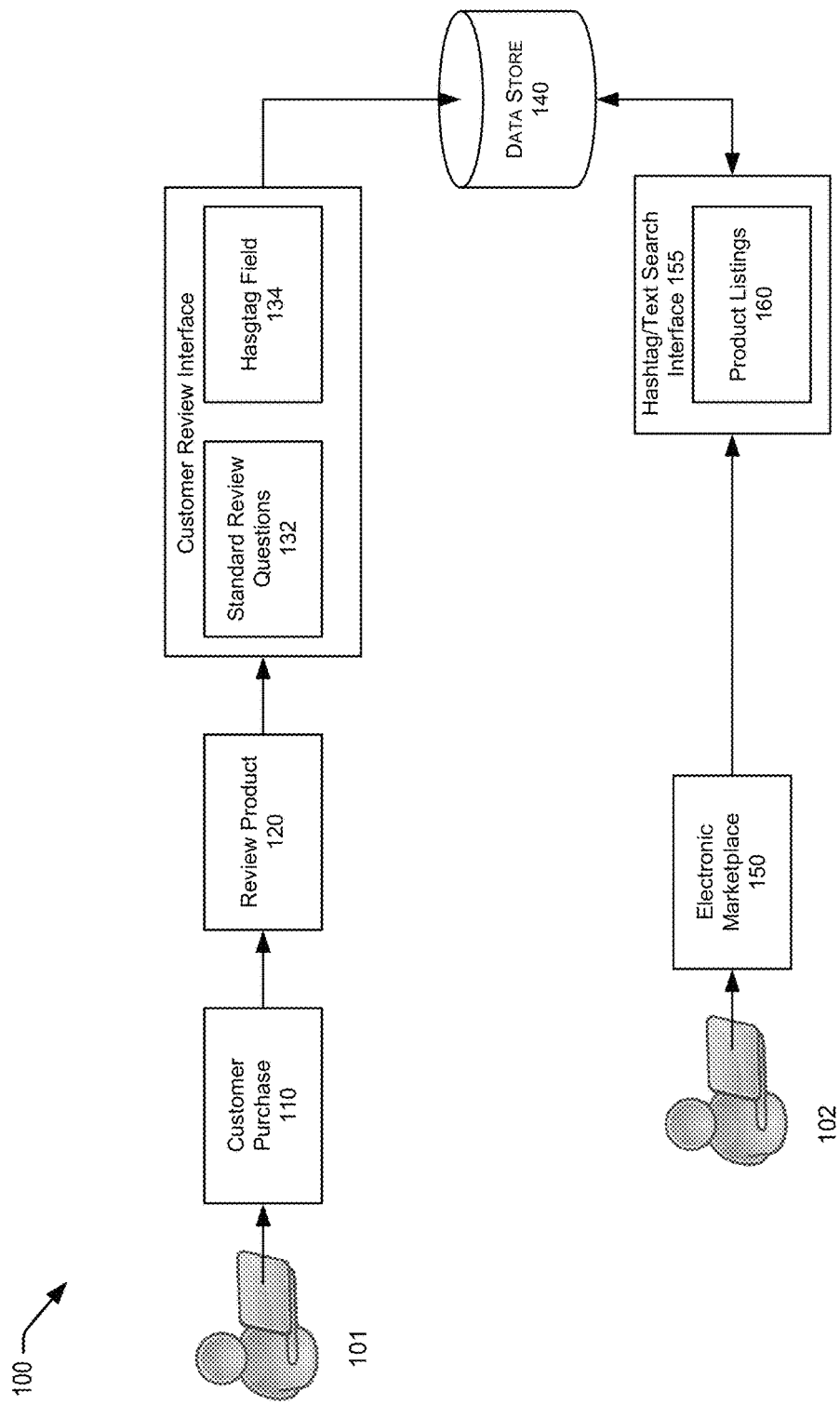
FIG. 1 illustrates a high-level network environment for implementing a tag identifier assignment and search system, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

According to certain aspects of the disclosure, users of an electronic marketplace may be provided with an interface to suggest associating one or more tag identifiers, such as a hashtag identifier, with items that are offered for sale. Records associating the suggested tag identifiers and items for sale may be stored, and searched by other users, in order to provide purchase recommendations, which may not otherwise be available using product-descriptive searches. For example, tag identifiers may be used to associate products and/or services with events, such as a particular birthday or anniversary, and users can easily search for items based on intuitive tag identifiers, such as #8thbirthday, #10thanniversary, #firsttimedad, etc.

It should be understood that "items" described herein should be broadly construed to include products, services, media files and other tangible and intangible objects offered in the context of electronic marketplaces and other web-based services. Likewise, items offered for "sale" or "purchase" may include any of the foregoing items that may be sold, purchased, licensed, rented, downloaded, streamed or otherwise contracted for.

In some examples, an electronic marketplace, or other web service, managed by a service provider may include a data store with various listings, e.g. for items offered for sale. Each of the listings may include a plurality of information attributes, such as an item identifier, item attributes, price, seller information, product and/or service category, etc.

In some examples, an order for an item for sale may be received from a first user, and a review interface for the item may be initiated with the first user based on the order. A first instruction may be received, via the review interface, to associate a tag identifier with the item. Examples may include storing a record in a data store associating the tag identifier with the item based on the first instruction received from the first user.

As used herein, associating tag identifiers with items should be broadly construed to include associating tag identifiers with item listings, item identifiers, item links, or other records sufficiently related to the item(s) to allow a user to purchase or otherwise access the item. Such associations may be accomplished using, for example, search indexes, tables, database records for one or more tag identifiers, database records (e.g. listings) for one or more items, and/or combinations thereof.

In some examples, a plurality of possible tag identifiers may be suggested to the first user based on parameters such as previous user associations, automated associations using the information attributes included in item listings, etc. In some examples, the tag identifier may be a text string that begins with a predetermined non-alphanumeric character, such as a hashtag identifier like #example. In some instances, tag identifiers may also be simply be referred to herein as "tags."

In some examples, a search request including the tag identifier may be received from a second user, and the data store may be searched based on the search request in order to identify items associated with the tag identifier.

Examples may include providing a response to the second user based on searching the data store. The response may include, for example, computer code instructions for purchasing, licensing, renting, downloading, streaming, or otherwise contracting for, one or more items associated with the tag identifier.

In some examples, an exact match for the tag identifier being searched may not be required in order to provide a positive response to the search query. For example, historical data analysis, fuzzy logic or other matching and/or approximating techniques may be used in order to identify likely matches, disregard misspelled words, etc.

In some examples, the review interface may include at least a first question for ranking customer satisfaction with the item, and a second question for associating the tag identifier with the item.

In some examples, the information attributes for listings may include item category identifiers, and a given tag identifier may be associated with at least two different listings with different category identifiers. For example, a tag identifier for a #birthday may be associated with different types of products (e.g. candles, cakes, trending electronics, etc.), different types of media files (audio, video karaoke, etc.), and/or different types of services (e.g. entertainers, tenting or catering services, etc.).

In some examples, the search response may be based, at least in part, on customer information associated with the second user, and/or social media information that is obtained from a social media site outside of the electronic marketplace.

In some examples, a record associating the tag identifier with an item may include one or more scores, such as comparative and/or absolute rankings that reflect an affinity of the item with the tag identifier. Examples may include modifying such scores based on feedback from the second user, other customer information, seasonal information, social media information, purchase information, promotional information, regional information, etc.

In some examples, providing the response to the second user may include providing a reference to an item that is associated with the tag identifier by the service provider (e.g. without reference to user suggestions). This may include, for example, tag associations that have been purchased by advertisers or other merchants cooperating with the electronic marketplace, and/or associations determined independently by the service provider (e.g. based on purchase histories, seasonal information, keyword analysis, customer information, etc.) or in coordination with social media or other informational sites (e.g. based on trending products, "likes," positive product, media and/or service reviews, etc.). In some examples, the reference to an item may include a link to a network resource outside of the electronic marketplace.

According to other aspects of the disclosure, a first interface, associated with an item, may be initiated during a browsing session with a first user. The first user may be prompted to respond to a question regarding the item, and a response to the question regarding the item may be received. One or more possible tag identifiers may be determined based at least in part on the response to the question regarding the item.

Examples may include presenting the first user with a list of the possible tag identifiers, and receiving a response indicating whether any of the possible tag identifiers should be associated with the item. In some examples, a record associating the item with any of the possible tag identifiers selected by the first user may be stored in a data store.

Examples may also include receiving a search request, including a search identifier, from a second user, and searching the data store based at least in part on the search request. A response may be provided to the second user including computer code instructions for purchasing (or otherwise accessing) the item if the search identifier corresponds to any of the tag identifiers that have been associated with the item. In some examples, a ranking associated with the item and the tag identifier may be modified based on whether the second user purchases (or otherwise accesses) the item.

In some examples, the response to the second user may be based, at least in part, on customer information associated with the second user, and/or social media information that is obtained from a social media site outside of the electronic marketplace.

In some examples, the second user may be provided with a list of suggested search identifiers, and the search request may be based on the second user selecting the search identifier from among the list of suggested search identifiers. The list of suggested search identifiers may be based on, for example, an uncommon or unrecognized tag identifier and/or a plain language search request, received from the second user.

According to other aspects of the disclosure, suggestions from a plurality of users to associate various tag identifiers with items offered for sale in an electronic marketplace may be received, and one or more records may be stored associating the various tag identifiers with specific items based at least in part on the user suggestions.

In some examples, a search query may be received including at least one of the tag identifiers, and a recommendation may be provided in response to the search query including computer code instructions for accessing at least one the items for sale that is associated with the tag identifier(s) included in the search query.

In some examples, the search query may include a plurality of tag identifiers and the record(s) may be searched based on the plurality of tag identifiers. In some examples, the search query may include additional information, besides the tag identifier(s), such as user information, regional information, price range, item category, additional search strings, etc. Search results may be provided based on item(s) that best correspond to the plurality of tag identifiers and/or the additional information.

In some examples, providing the recommendation may be based, at least in part, on user information associated with a user submitting the search query.

According to further aspects of the disclosure, searches may be performed in the context of a web service, such as a web search engine, an electronic or virtual storefront accessible by customers to search for and purchase items or services, cloud storage, etc. As used herein, web services should be broadly understood as applying to various public and/or private network (e.g., the Internet) services including, for example, distributed databases, cloud storage, e-commerce, publishing, or similar services supported by network and/or web-based storage. In some examples, a given web service may be associated with a particular webstore or virtual storefront for a particular merchant.

In some examples, a web service such as a website, a virtual storefront, a webstore, etc., may be provided as part of an electronic marketplace, and may be managed by one or more service provider computers (e.g., servers) that host electronic content in the form of, for example, an electronic catalog, with or without associated purchase and billing functionality, may be provided for various merchants or tenants. Customers may access the web service, e.g., a virtual storefront, to search for, view, review, discuss, order and/or purchase items (e.g., physical items or services) from the web service.

According to further aspects of the disclosure, a computer-readable storage device may be provided storing computer-executable instructions that, when executed by one or more computer systems, configure the one or more computer systems to perform operations described herein.

As used herein, the term "merchant" includes any entity capable of conducting and/or fulfilling a sales transaction in response to an actual or expected order or request. Typically, a merchant may present or offer various products or items to its customers, as well as information about those items (e.g., availability and pricing information, product details, images, etc.) that facilitate a sale. For example, a retail enterprise that generally sells merchandise to end consumers (e.g., not generally intended for resale as new) may sell through an online, web-based channel that may include an online catalog or portal configured to display information about items or products, a web-based order entry system such as a virtual shopping cart or other system, a status tracking tool through which customers may track the status or progress of orders, a search engine, and any of a number of other features suitable for promoting and performing sales transactions. Merchants may also engage in transactions using other types of sales channels. For example, a merchant may employ a mail-order catalog channel, where customers may receive information about items or products via a mailed catalog and make orders using paper forms and/or via telephone. Additionally or alternatively, a merchant may have a physical (i.e., "brick-and-mortar") store, through which customers may receive information about products and order or purchase those products in person. A merchant may rely on a service provider or other vendor for any portion of processing a transaction, e.g. from presenting an online catalogue to customers, through acceptance of an order, processing payment, delivery of the order, order completion and processing returns.

As used herein, the term "customer" includes any purchaser (or potential purchaser) of an item, product, download, service, etc., including entities other than an end consumer of a product sold. Therefore, manufacturers, distributors, retailers and consumers may be "merchants" and/or "customers" depending upon their position within the supply chain. It is noted that in some embodiments, a unit of an item may be rented, leased or licensed to a customer under specific terms in exchange for revenue or other economic consideration.

As used herein, the term "sale" includes any suitable transaction involving an item resulting in either direct or indirect (e.g., imputed or tangential) revenue, and is intended to encompass rentals, leases, subscriptions, licenses and other types of revenue models.

The techniques described above and below may be implemented in a number of ways and in a number of contexts. Several example implementations and contexts are provided with reference to the following figures, as described below in more detail. However, the following implementations and contexts are but a few of many.

Turning to FIG. 1, a high-level depiction of an environment 100 including a tag identifier generation and search system, according to aspects of the disclosure, is provided. As shown in FIG. 1, a plurality of users 101, 102 may access various web pages of a web service, such as an electronic marketplace including listings, e.g. for items offered for sale, stored in data store 140.

User 101 may access an interface 101 for purchasing an item, and may purchase the item according to various methods known in the art. Interface 101 may more generally provide access to listings for items that may be sold, purchased, licensed, rented, downloaded, streamed or otherwise contracted for through a service provider, and may include listings for any number of merchants cooperating in the context of the web service.

The user 101 may be provided with an opportunity to review the purchased item via an interface 120. This can take many forms including the automatic presentation of a web page, or selectable option after a check-out procedure, or sending the user 101 an automated message, such as an email or instant message, with a link to a customer review interface.

If the user 101 proceeds with the product review, a customer review interface may be provided including a combination of review question interface 132 (including fields or other input means for ranking various qualities of the product, submitting customer satisfaction and/or providing other product or user information), and a tag identifier interface 134 (such as a hashtag input and/or selection interface).

Based on the interaction of user 101 with the review question interface 132 and the tag identifier interface 134, records may be stored, e.g. generated and/or modified, in data store 140 that associate various tag identifiers with specific items. Such associations may be accomplished using, for example, search indexes, tables, database records for one or more tag identifiers, database records (e.g. listings) for one or more items, and/or combinations thereof.

These records may then be accessed in support of searches initiated by user 102. User 102 may access an electronic marketplace web page 150 including various search, browsing and purchase functionality as described further herein. The user 102 may enter plain text searches and/or tag identifier searches via search interface 155, and be provided with search results from data store 140 including specific product listings 160 associated with the plain text and/or tag identifier(s). Further details regarding the operation of a data store supporting such searches are shown in FIG. 2.

Figure 2:
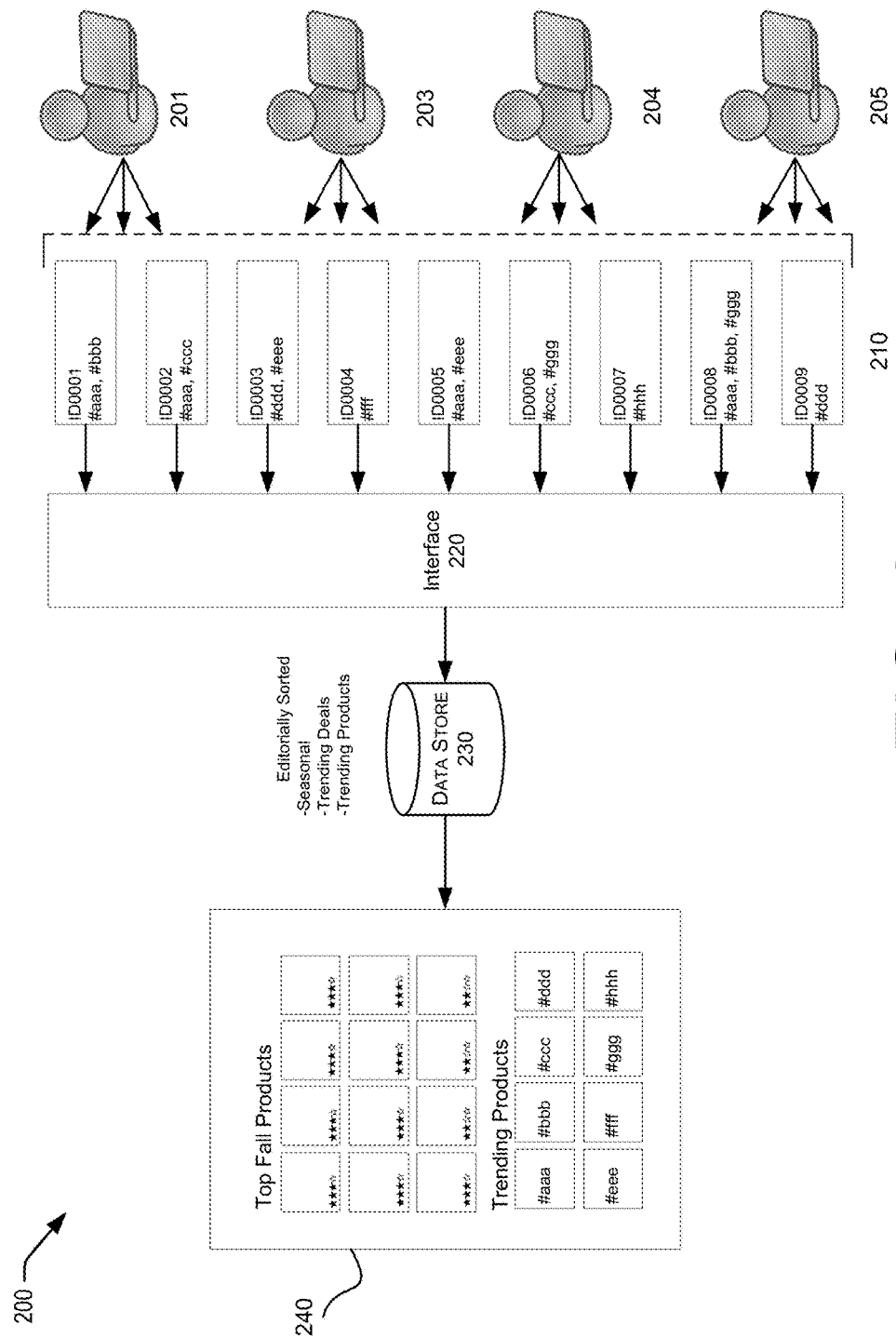
FIG. 2 provides further details regarding generation of a tag identifier item database, according to at least one example.

As shown in FIG. 2, environment 200 may support a plurality of users 201-205, all of whom may provide input to data store 230 via interface 220. In the example shown in FIG. 2, the users 201-205 may each provide feedback, such as user reviews and suggested tag identifiers, of items with unique identifiers ID0001-ID0009, etc. Item records can be searched and/or modified via individualized interfaces, generally depicted by elements 210 associated with item identifiers ID0001-ID0009. Interface elements 210 are generally shown including at least one of item identifiers ID0001-ID0009 associated with various combinations of tag identifiers #aaa-#hhh. As mentioned previously, in some examples, tag identifiers (generically represented in FIG. 2 as #aaa etc.) may include any non-alphanumeric character at the beginning of the string, followed by various text strings, which may include intuitive words and/or phrases to help classify items according to use, events or other non-product specific indicia, e.g. #8thbirthday, %graduationparty, &summervacation. The specific associations for a given item may be derived from the individual and/or cumulative inputs of users 201-205, etc., and/or assigned independently by a service provider supporting the electronic marketplace environment. For example, ID0008 may have one associated tag identifier #aaa suggested by one user, e.g. 201, a second associated tag identifier #bbb suggested by another user, e.g. 202, and a third associated tag identifier #ggg that is assigned by the service provider, e.g. according to seasonal information, sales data, word searches, etc.

Item records/listings associated with the items identified in interface elements 210 may be stored in data store 230 and can include any number of additional information attributes as discussed further herein, such as, for example, item attributes, price, seller information, product and/or service category, etc. Interface 220 may be configured to support one or more of search, purchase and/or tag identifier suggestion and association, and provide related interfaces to users as discussed further herein.

The service represented in FIG. 2 may be accessed by users 201-205 via a network, such as the Internet, and any number of network-accessible data store(s) 230 or other resources, such as web pages, etc., may also be available to the users 201-205 via the network. At least some of the users 201-205 may be assigned a profile by the service provider including various parameters that may be used to process tag associations and/or search queries as discussed further herein.

Window 240 generally depicts how content of data store 230 may be organized by the service provider according to various factors including certain items grouped according to customer rankings, e.g. "Top Fall Products," and groups of products associated with tag identifiers that may be detected to be "trending," e.g. based on increased user association and/or searches or based on other information obtained internally from the service provider or from outside sources, such as social media or other informational sites. Such groupings may be achieved in various ways including search indexes, tables and/or data fields in individual listings or tag identifier records. Further details regarding an exemplary GUI for obtaining user input on tag identifier associations are shown in FIG. 3.

Figure 3:
FIG. 3 illustrates an exemplary GUI for receiving user input to a tag identifier database, according to at least one other example.
Figure 4:
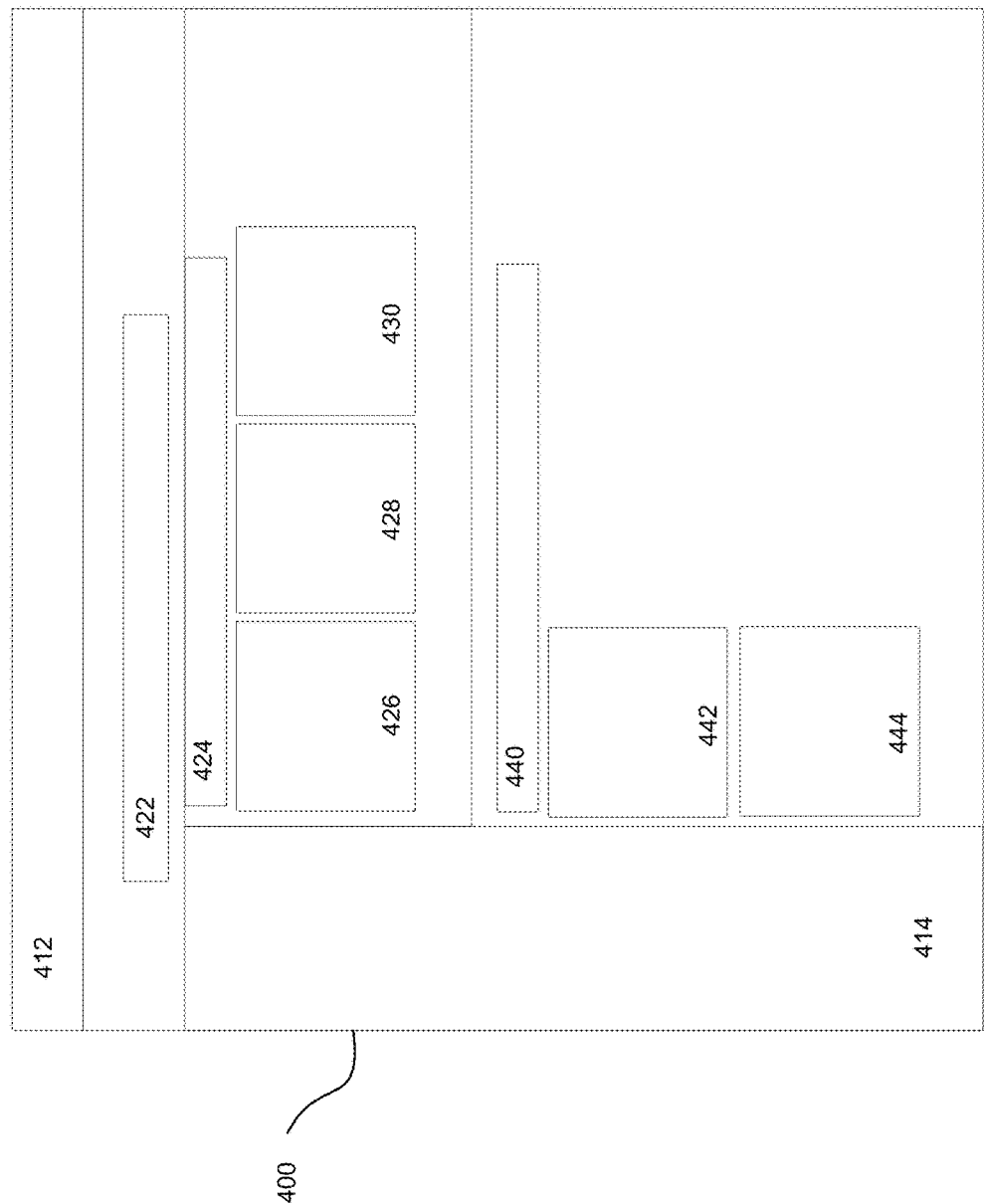
FIG. 4 illustrates another exemplary GUI for providing a tag identifier search, according to at least one other example.

FIGS. 3-4 illustrate various aspects of exemplary GUIs including web pages, in which information may be exchanged with users according to aspects of the disclosure. The specific arrangement of elements depicted as included are not intended to be limiting and it is to be understood that GUIs can take on many different forms.

As shown in FIG. 3, exemplary GUI 300 may include one or more command bars 312, and a work area including various fields for user input 330, 332, 334 and 336, and an item information display area 322. GUI 300 may be automatically presented to a user, for example, after completing a checkout procedure for purchasing or otherwise accessing an item, or may be called by the user via links or other instructions included in an application, a web page, an email or other message.

GUI 300 includes a field 330 for receiving user information, and a rating input generally shown as selectable stars that can be used to provide an overall customer satisfaction with the item shown in window 322. The item information included in window 322 may include any type of information associated with the item being reviewed by the customer, e.g. an image, a cover, descriptive text, etc.

GUI 300 also includes fields 332 and 334 that may be configured to receive information from the user to help suggest possible tags for the item. For example, field 332 may ask for input on what the item is being used for and field 334 may ask the user why they purchased the item, e.g. a certain event, who they bought it for, etc. Text input into fields 332 and/or 334 may be processed, e.g. by the service provider, using word searches, disambiguation or other techniques to identify possible tags that the customer may want to associate with the item. For example, if the customer types in that the item was purchased for an anniversary, a tag identifier for a corresponding event may be suggested, e.g. #anniversary. In some examples, additional questions may be presented to the user based on the input in 332 and/or 334, such as to provide further detail and/or disambiguation. In the event that the input to 332 and/or 334 suggest one or more possible tag identifiers, the suggested tag identifier(s) can be presented in areas 342, 344, 346, etc. In some examples, a plurality of possible tag identifiers may be suggested to the user in areas 342, 344, 346, based on parameters such as previous user associations, automated associations using the information attributes included in item listing(s), etc.

Areas 342, 344, 346 may be configured as selectable icons that are operable to send an instruction to associate the suggested tag identifier with the item, or to auto populate window 336, when clicked by the customer.

GUI 300 may also include a field 336 for directly inputting a tag identifier. In some examples, if the tag identifier that is input by the customer in field 336 is recognized, an instruction may be sent to associate the tag identifier with the item. In some examples, if the tag identifier input in field 336 is not recognized (e.g. it has never been associated with an item in the data store), the customer may queried regarding whether they wish to create a new tag identifier in the system, and/or suggested (existing) tag identifiers may be provided in areas 342, 344, 346, etc.

In some examples, GUI 300 may be configured to allow the customer to associate any number of tag identifiers with the item, or it may limit the user to a predetermined number of associations.

When submitting the instructions to associate tag identifier(s) with the item, e.g. via 336, 342, 344 and/or 346, systems may also be configured to obtain other information associated with the customer and/or item. For example, user information may be submitted with an association request, and the system may approve or disapprove the association request based at least in part on the user information. The system may also be configured to reject at least some association requests based on other information, such as profanity filters, apparently nonsensical associations and/or tag identifiers, merchant or manufacturer preferences, etc.

FIG. 4 depicts another GUI 400 that may be used to provide searches and purchase functionality as discussed herein. GUI 400 may represent a web page for an electronic marketplace, and may include one or more command bars 412, 414 including standard web browser functions and/or informational windows.

GUI also includes a search field 422 for entering various text strings, such as plain text searches and/or tag identifiers. In some examples, field 424 may include one or more tag identifiers that are suggested based, at least in part, on the text input to 422. The suggested tag identifiers in field 424 may be based on, for example, an uncommon or unrecognized tag identifier and/or a plain language search request, input in 422.

Responses to tag identifier searches may be returned in areas 426, 428, 430, etc. These areas may be configured as selectable icons including computer code instructions for purchasing, licensing, renting, downloading, streaming, or otherwise contracting for, one or more items associated with one or more tag identifiers input or automatically populated in 424. In some examples, one or more of areas 426, 428, 430 may include a ranking interface, or confirmation interface, whereby the user can rank or confirm the suggestions with respect to how well they fit the user's understanding of the relevant tag search(es). Such information may be collected and used by the system to adjust ranking or scores of the items and associated tag identifiers.

In some examples, an exact match for the tag identifier(s) in 424 may not be required in order to provide a response to the search query. For example, historical data analysis, fuzzy logic or other matching and/or approximating techniques may be used in order to identify likely matches, disregard misspelled words, etc.

In some examples, information in one or more of areas 426, 428, 430 may include a reference to an item that is associated with the tag identifier(s) in 424 by virtue of the tag identifier having been purchased, or other fees paid, by advertisers or other merchants cooperating with the electronic marketplace. In some examples, information in one or more of areas 426, 428, 430 may include a reference to an item that is associated with the tag identifier(s) in 424 by virtue of associations determined independently by the service provider (e.g. based on purchase histories, seasonal information, keyword analysis, customer information, etc.) or in coordination with social media or other informational sites (e.g. based on trending products, "likes," positive product, media and/or service reviews, etc.). In some examples, the reference to an item in one or more of areas 426, 428, 430 may include a link to a network resource outside of the electronic marketplace that provides web page 400.

In some examples, suggested plain text search terms may be included in area 440, e.g. based on plain text and/or tag identifiers input in 422. These may be configured as selectable hyperlinks with computer code for executing a search including the suggested language. Responses to plain text searches may be returned in areas 442, 444, etc. These areas may also be configured as selectable icons including computer code instructions for purchasing, licensing, renting, downloading, streaming, or otherwise contracting for, one or more items associated with one or more plain text searches input in 422 or automatically populated and/or selected in 440.

Items included in any of areas 426, 428, 430, 442, 444, etc., may include, for example, a predetermined number of top-selling items, a predetermined number of top-rated items, a predetermined number of currently trending (e.g. on one or more social media sites) items, one or more accessories and/or services that are associated with an identified item, etc.

In general, searches based on information input or populated to areas 422, 424, or 440 may return a list of documents that are responsive to a given query, e.g. listings that are associated with selected tag identifier(s).

In some examples, various metadata may be used to influence ranking of the tag identifier search results, which may be independent of plain text search ranking. For example, several results may all satisfy a plain text search query equally well, but the metadata associated with the tag identifier search may be used to rank one above another.

Figure 5:
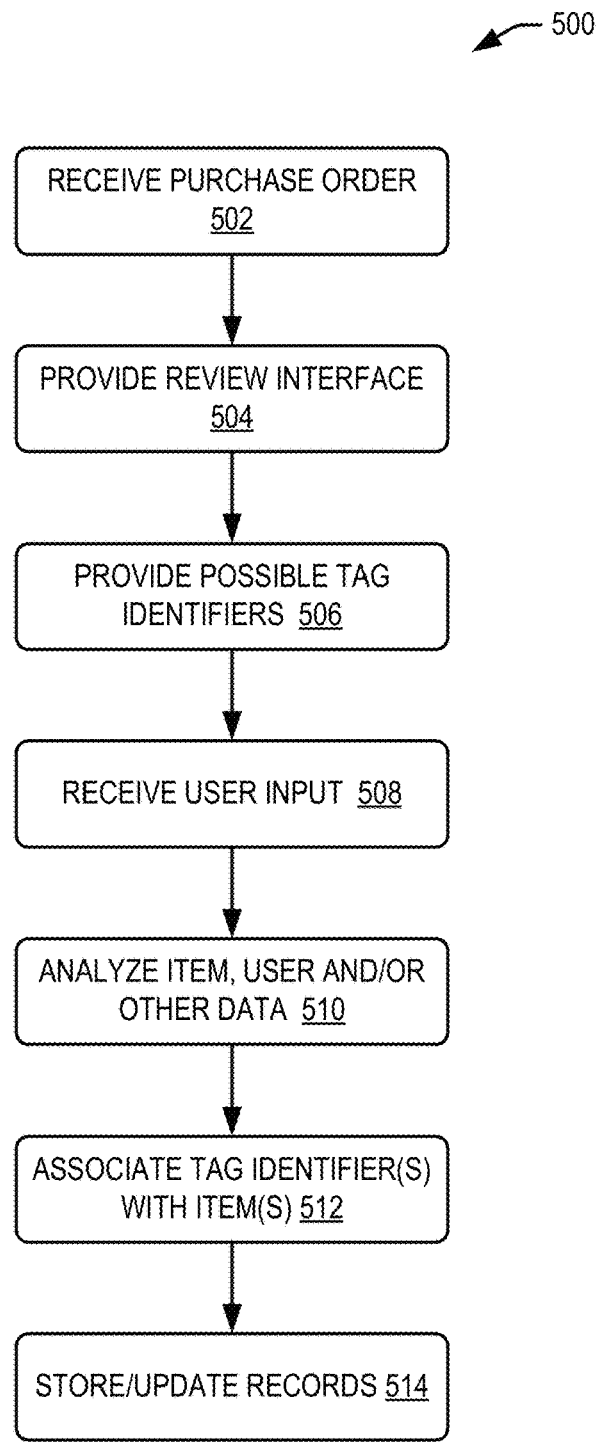
FIG. 5 is a flow diagram depicting an exemplary process for providing tag identifiers associated with items, as described herein, according to at least one other example.
Figure 6:
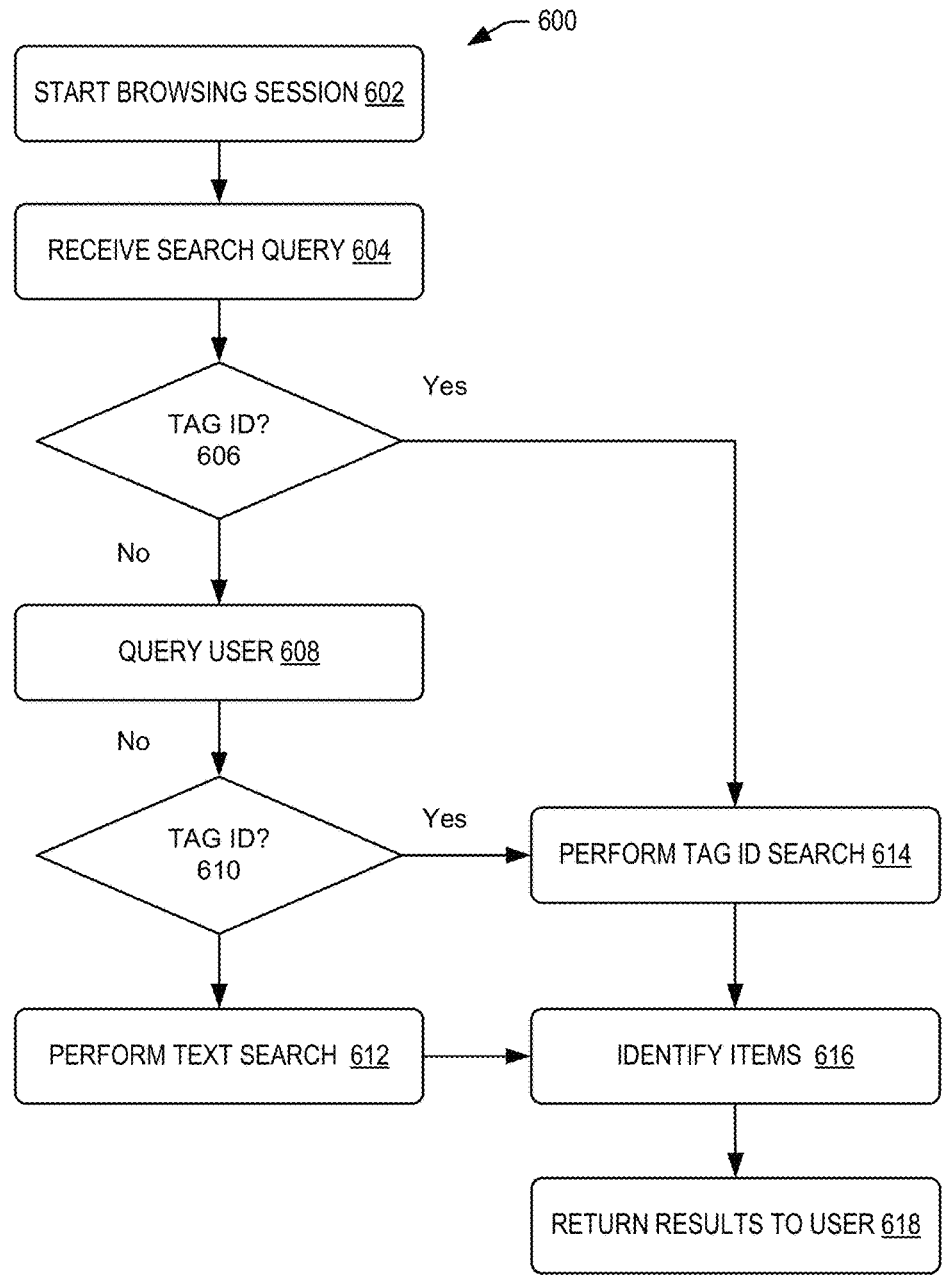
FIG. 6 is a flow diagram depicting an exemplary process for providing tag identifier searches, as described herein, according to at least one other example.
Figure 7:
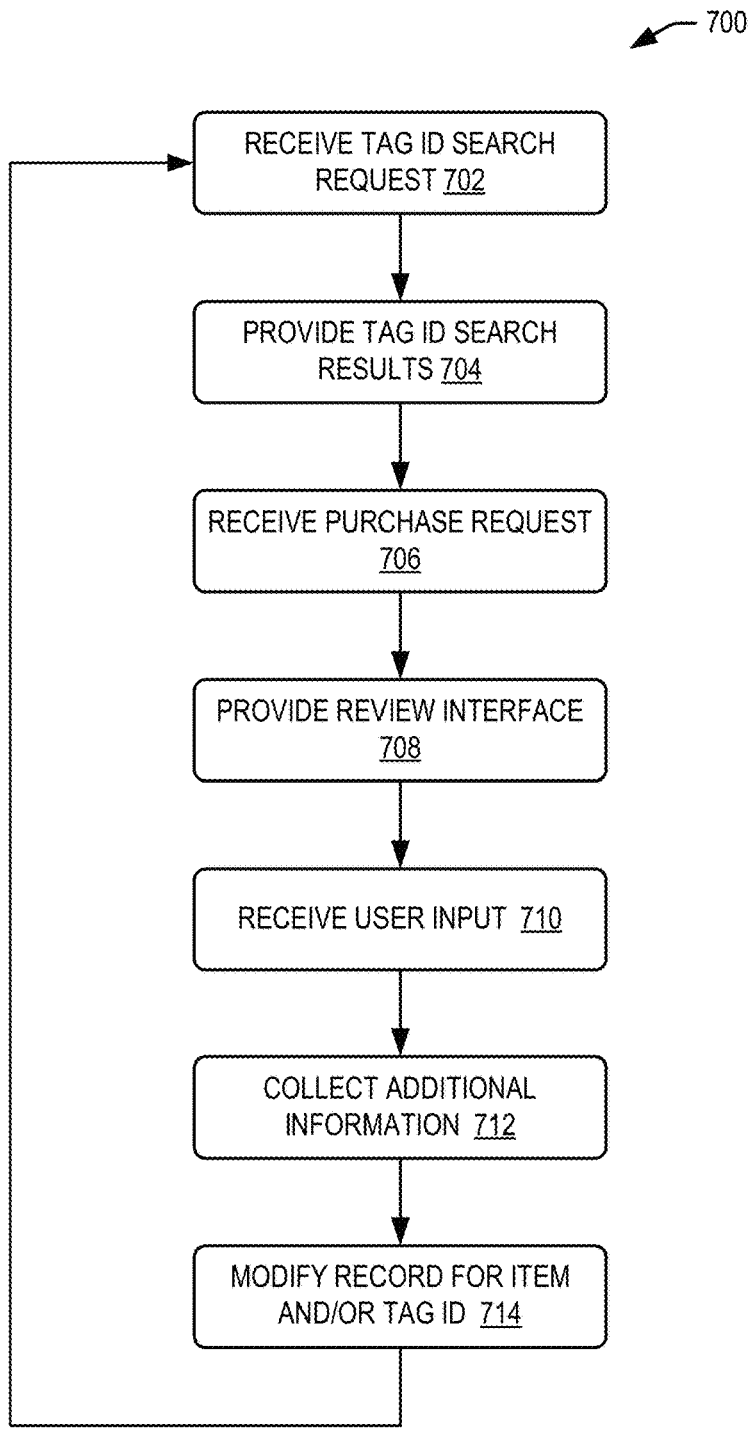
FIG. 7 is a flow diagram depicting an exemplary process including modifying tag identifier associations, as described herein, according to at least one other example.

FIGS. 5-7 illustrate example flow diagrams showing respective processes 500, 600 and 700 for implementing processes as described herein. These processes are illustrated as logical flow diagrams, each operation of which may represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes. Additionally, any specific reference to one or more operations being capable of being performed in a different order is not to be understood as suggesting that other operations may not be performed in another order.

Some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

FIG. 5 depicts an illustrative flow 500 in which techniques for associating tag identifiers and items may be implemented. In illustrative flow 500, operations may be performed by one or more processors of one or more service provider computers and/or instructions for performing the operations may be stored in one or more memories of the service provider computers.

The flow 500 may begin at 502, in an order, such as a purchase order, is received by the service provider, e.g. via interface 110 in FIG. 1. The purchase order may be processed according to techniques known in the art, e.g. including processing a payment, encumbering inventory, packaging, shipping and delivering a physical product, or downloading or streaming programs and/or media files, etc.

The flow 500 may optionally continue with 504, in which a review interface is provided to a user, e.g. a customer associated with the purchase in 50. This may be accomplished by various means as discussed previously, e.g. as described with reference to FIG. 3.

The flow 500 may optionally continue with 506, in which one or more possible tag identifiers may be identified and/or provided to the user based on information acquired in 504.

The flow 500 may optionally continue with 508, in which a user input, e.g. a selection of one or more of the possible tag identifiers, or a user-input tag identifier, is received. This may be in the form of, for example, an instruction to associate one or more tag identifier with the item.

The flow 500 may optionally continue with 510, in which additional item, user and/or other data may be analyzed in order to determine whether to associate the selected or input tag identifier with the item. This can include, for example, manufacturer preferences not to associate the item with certain tags, apparent inconsistencies between an input tag and an item's recommended age range or other attribute, a ranking score associated with the user, profanity filters, etc. If a determination is made in 510 not to associate a suggested or input tag with the item, a message may be sent to the user notifying them of the rejection, with or without explanation and/or suggested alternatives.

The flow 500 may optionally continue with 512, in which one or more tag identifiers may be associated with the item, e.g. via search indexes, tables, database records for one or more tag identifiers, database records (e.g. listings) for one or more items, and/or combinations thereof.

The flow 500 may optionally continue with 514, in which the necessary records may be stored, e.g. created and/or modified, to reflect the associations determined in 512. This may include, for example, creating a new association between an item and a tag identifier, e.g. if the tag has not been used before, or if the tag has not been associated with that item before, or modifying an existing record to reflect an increased affinity, score, etc. 514 may also represent an aggregated action whereby the results of many user suggestions and/or item-related information may be analyzed to determine adjustments to existing associations or new associations.

Additional details regarding possible steps that may be implemented in a search service are discussed further below with reference to FIG. 6. In illustrative flow 600, operations may be performed by one or more processors of one or more service provider computers and/or instructions for performing the operations may be stored in one or more memories of the service provider computers.

The flow 600 may begin at 602, in which a browsing session may be started, e.g. between a user and one or more service provider servers via a network.

The flow 600 may optionally continue with 604, in which a query is received by the search service, such as interface 155 in FIG. 1. The search query may include a tag identifier as described herein, as well as any information that is typically known in the art, e.g. text or other data objects, as well as metadata associated with, for example, the requesting user, a web address, a geographic region, timestamp information, etc.

The flow 600 may optionally continue with 606, in which a determination is made regarding whether the search query includes a tag identifier. If a tag identifier is not included, if an unacceptable tag identifier is included, and/or if a previously unassociated tag identifier is included, the method may continue with 608, in which the requesting user may be queried, e.g. by providing one or more possible tag identifiers based on information included in the search query, by requesting additional information to help identify possible tag identifiers, by notifying the user that the proposed tag identifier is unacceptable and/or suggesting possible alternatives to the rejected or unassociated tag identifier.

The flow may optionally continue from 608 with 610, in which a further determination is made regarding whether the search query includes an acceptable tag identifier based on any response to the query in 608.

If an acceptable tag identifier is still not included, if an unacceptable tag identifier is included, and/or if a previously unassociated tag identifier is still included, the method may return to 608 (processing further queries to the user, or may continue with 610, in which a text search may be performed without reference to a tag identifier.

If either of 606 or 610 identify one or more acceptable tag identifiers, the flow may optionally continue with 614, in which a search is performed based on the one or more acceptable tag identifiers.

The flow may continue from 614 or 612 to 616, in which items corresponding to the search are identified, e.g. via plain text search as from 612, or based on the one or more tag identifiers from 614. This may include, for example, ranking the items according to various methodologies and in consideration of parameters such as comparative and/or absolute rankings that reflect an affinity of the item with the tag identifier, customer preferences, seasonal information, social media information, purchase information, promotional information, regional information, etc.

The flow 600 may continue with 618, in which the results of the search from 612 or 614, may be returned to the requesting user, e.g. via an interface as described with reference to FIG. 4.

Additional details regarding possible steps that may be implemented in updating records in a search service as described herein are discussed further below with reference to FIG. 7. In illustrative flow 700, operations may be performed by one or more processors of one or more service provider computers and/or instructions for performing the operations may be stored in one or more memories of the service provider computers.

The flow 700 may begin at 702, in which a tag identifier search request is received by the search service, and may continue with 704, in which search results are provided in response to the search request from 702. These steps may be performed as described previously.

The flow 700 may continue with 706, in which a purchase request may be received for one or more of the items included in the search results provided in 706. This may be performed, for example, via an interface as shown in FIG. 4, e.g. by the user selecting any of the areas 426, 428, 430, 442, 444, etc.

The flow 700 may continue with 708, in which a review interface, such as shown in FIG. 3, may be presented to the user/purchaser. The review interface in 708 may also include one or more fields for receiving input related to the user's satisfaction with the item as it relates to the tag identifier, e.g. how well did the item correlate with the tag and/or satisfy the user/purchaser's subjective intent.

The flow 700 may continue with 710, in which input from the user/purchaser may be received via the interface provided in 708. This may include various information previously described, as well as the additional information related to the user's satisfaction with the item as it relates to the tag identifier.

The flow 700 may continue with 712, in which additional information may be collected, e.g. other customer information, updated seasonal information, social media information, product/service review information, updated purchase information, updated promotional information, updated regional information, etc.

The flow 700 may continue with 714, in which one or more records for an item, a tag identifier, and/or an association of an item with a tag identifier may be updated based on any of the information collected in 710 and 712. This may include, for example, adjusting a ranking of the affinity of an item with a tag based on a positive or negative feedback from the user/purchaser, changes in current information related to the item, and/or combinations thereof.

The flow 700 may continue with 702, in which the flow may continue in an iterative manner.

Figure 8:
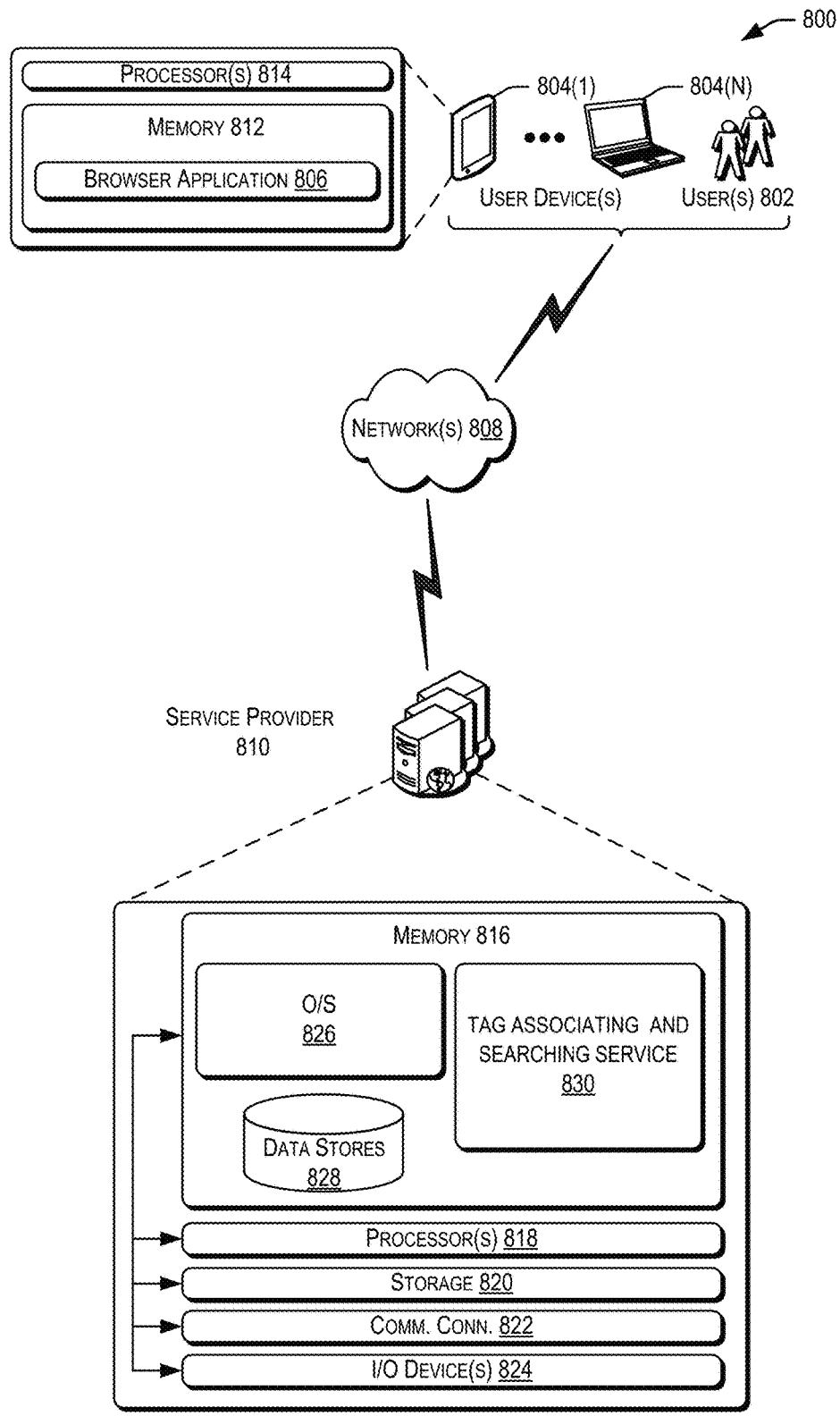
FIG. 8 illustrates an example architecture for implementing a tag identifier assignment and search system described herein, according to at least one example.

FIG. 8 depicts an illustrative system or architecture 800 that depicts aspects of a tag association and searching system applied in an electronic marketplace, as described herein. In architecture 800, one or more users 802 (i.e., electronic marketplace consumers or web browser users) may utilize user computing devices 804(1)-(N) (collectively, user devices 804) to access a browser application 806 (e.g., a web browser) or a user interface accessible through the browser application 806 via one or more networks 808.

In some aspects, the browser application 806 may be configured to receive, store and/or display a website including search functionality (e.g., an electronic marketplace website), or other interface on a display screen of the user devices 804. In accordance with at least one embodiment, in addition to accessing the browser application 806 to view the electronic marketplace website, the users 802 may also utilize one or more native applications (e.g., a software application program) developed for use on a particular platform compatible with the user devices 804 to access and/or search the electronic marketplace or other web service such as social media sites including text, images, videos and/or audio data. The one or more service provider computers 810 may, in some examples, provide computing resources such as, but not limited to, data storage, data access, management, virtualization, cloud-based software solutions, electronic content performance management, and the like. The one or more service provider computers 810 may also be operable to provide web hosting, computer application development and/or implementation platforms, combinations of the foregoing, or the like to the one or more users 802.

In some examples, the networks 808 may include any one or a combination of many different types of networks, such as cable networks, the Internet, wireless networks, cellular networks and other private and/or public networks. While the illustrated example represents the users 802 accessing the browser application 806 over the networks 808, the described techniques may equally apply in instances where the users 802 interact with the service provider computers 810 via the one or more user devices 804 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the browser application 806 may allow the users 802 to interact with the service provider computers 810 (e.g., via the electronic marketplace website), such as to search for, browse for or purchase items offered by the electronic marketplace, described herein. The one or more service provider computers 810, perhaps arranged in a cluster of servers or as a server farm, may host the electronic marketplace website and/or cloud-based software services. Other server architectures may also be used to host the electronic marketplace website and/or cloud-based software services. The browser application 806 may be capable of handling requests from many users 802 and serving, in response, various user interfaces that can be rendered at the user devices. In one example, the browser application 806 may be capable of receiving search queries from one or more users 804, and in response to the search queries, render network content (e.g., a web page) that includes hypertext information (e.g., information formatted in accordance with a hypertext markup language such as HTML) about an item listed (e.g., offered for sale) in an electronic marketplace system. The browser application 806 can also provide any type of website that supports user interaction, including search engine sites. The described techniques may similarly be implemented outside of the browser application 806, such as with other applications running on the user devices 804.

The user devices 804 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user devices 804 may be in communication with the service provider computers 810 via the networks 808, or via other network connections. Additionally, the user devices 804 may be part of the distributed system managed by, controlled by, or otherwise part of the service provider computers 810.

In one illustrative configuration, the user devices 804 may include at least one memory 812 and one or more processing units (or processor(s)) 814. The processor(s) 814 may be implemented as appropriate in hardware, computer-executable instructions, firmware, or combinations thereof. Computer-executable instruction or firmware implementations of the processor(s) 814 may include computer-executable or machine-executable instructions written in any suitable programming language to perform the various functions described.

The memory 812 may store program instructions that are loadable and executable on the processor(s) 814, as well as data generated during the execution of these programs. Depending on the configuration and type of user device 804, the memory 812 may be volatile (such as random access memory (RAM)) and/or non-volatile (such as read-only memory (ROM), flash memory, etc.). The user device 804 may also include additional removable storage and/or non-removable storage including, but not limited to, magnetic storage, optical disks and/or tape storage. The disk drives and their associated computer-readable media may provide non-volatile storage of computer-readable instructions, data structures, program modules and other data for the computing devices. In some implementations, the memory 812 may include multiple different types of memory, such as static random access memory (SRAM), dynamic random access memory (DRAM), or ROM.

Turning to the contents of the memory 812 in more detail, the memory 812 may include an operating system and one or more application programs, modules, or services for implementing the features disclosed herein, such as via the browser application 806 or dedicated applications (e.g., smart phone applications, tablet applications, etc.). The browser application 806 may be configured to receive, store and/or display a website (e.g., the electronic marketplace website), or other interface for interacting with the service provider computers 810. In accordance with at least one embodiment, the browser application 806 may receive search queries submitted by the users 802 and provide the search queries to the service provider computers 810. Additionally, the memory 812 may store access credentials and/or other user information such as, but not limited to, user IDs, passwords and/or other user information.

In some aspects, the service provider computers 810 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in accordance with at least one embodiment, the service provider computers may be executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the service provider computers 810 may be in communication with the user devices 804 and/or other service providers via the networks 808, or via other network connections. The service provider computers 810 may include one or more servers, perhaps arranged in a cluster, as a server farm, or as individual servers not associated with one item detail page rating service described herein as part of an integrated, distributed computing environment.

In one illustrative configuration, the service provider computers 810 may include at least one memory 816 and one or more processing units (or processor(s)) 818. The processor(s) 818 may be implemented as appropriate in hardware, computer-executable instructions, firmware, or combinations thereof. Computer-executable instruction or firmware implementations of the processor(s) 818 may include computer-executable or machine-executable instructions written in any suitable programming language to perform the various functions described.

The memory 816 may store program instructions that are loadable and executable on the processor(s) 818, as well as data generated during the execution of these programs. Depending on the configuration and type of service provider computers 810, the memory 816 may be volatile (such as RAM) and/or non-volatile (such as ROM, flash memory, etc.). The service provider computers 810 or servers may also include additional storage 820, which may include removable storage and/or non-removable storage. The additional storage 820 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 816 may include multiple different types of memory, such as SRAM, DRAM, or ROM.

The memory 816, the additional storage 820, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 816 and the additional storage 820 are all examples of computer storage media. Additional types of computer storage media that may be present in the service provider computers 810 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computers 810. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computers 810 may also contain communications connection(s) 822 that allow the service provider computers 810 to communicate with a stored database, another computing device or server, user terminals and/or other devices on the networks 808. The service provider computers 810 may also include I/O device(s) 824, such as a keyboard, a mouse, a pen, a voice input device, a touch input device, a display, speakers, a printer, etc.

Turning to the contents of the memory 816 in more detail and will be described in further detail in FIG. 9, the memory 816 may include an operating system 826, one or more data stores 828, and/or one or more application programs, modules, or services for implementing the features disclosed herein, including a tag associating and searching service module 830.

Figure 9:
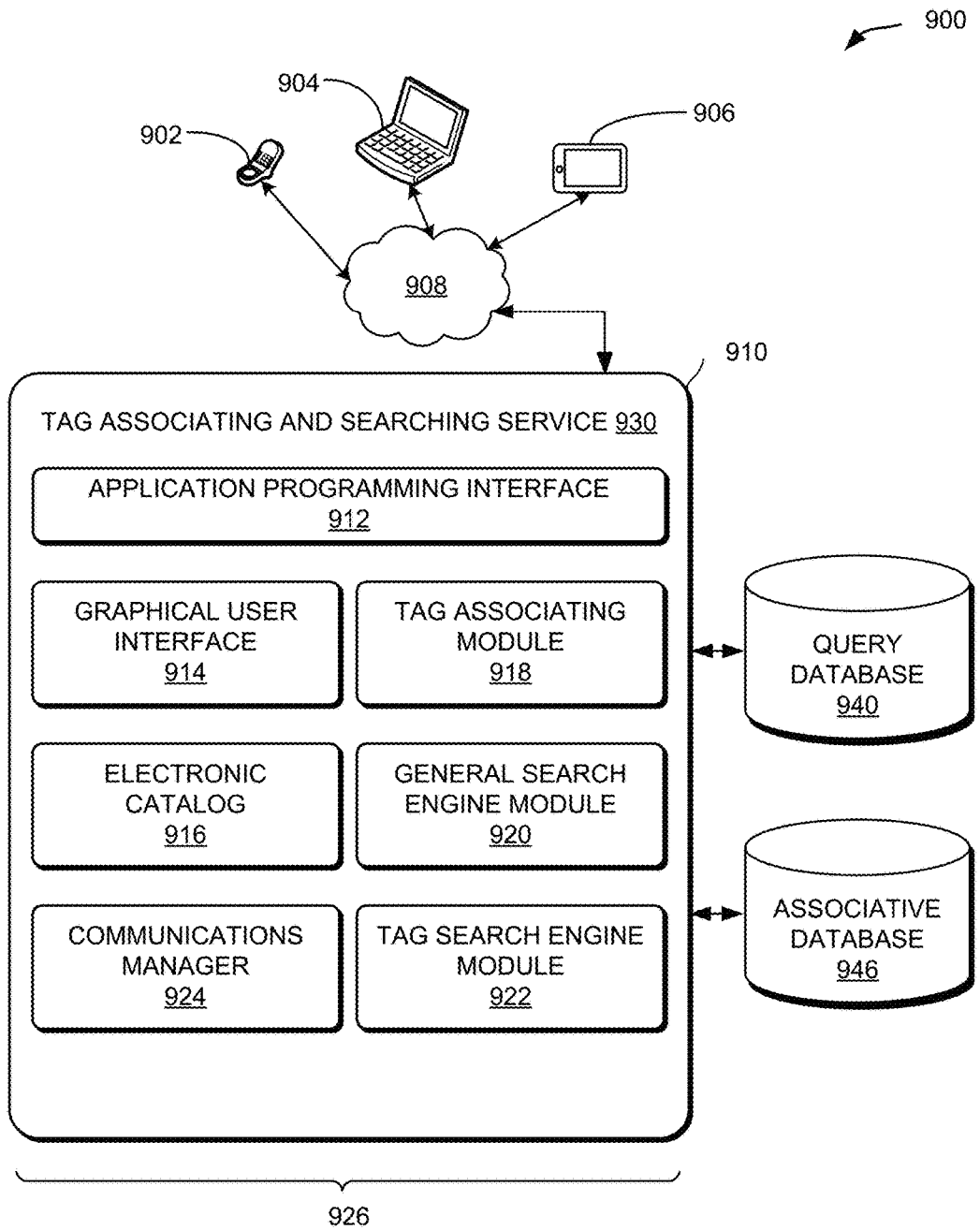
FIG. 9 illustrates further details of an example architecture for implementing a tag identifier assignment and search service described herein, according to at least one other example.

FIG. 9 illustrates an example architecture 900 of a query contextualizing and searching service, provided in the context of an electronic marketplace 910, in accordance with at least one embodiment of the present disclosure. The tag associating and searching service 930 may include a plurality of modules configured to implement functionality of the tag associating and searching services, described herein. The modules 926 may be software modules, hardware modules, or a combination thereof. If the modules 926 are software modules, the modules 926 can be embodied on a computer readable medium and processed by a processor in any of the computer systems described herein. It should be noted that any module or data store described herein, may be, in accordance with at least one embodiment, a service responsible for performing at least part of a multi-index search as described herein. The modules may be configured in the manner suggested in FIG. 9 or may exist as separate modules or services external to the electronic marketplace 910.

In accordance with at least one embodiment, a user may enter and submit search terms into a search query interface via an electronic device communicating with a network 908. The network 908 may be the same or similar as the networks 808 and 110 described above. The electronic device may include, for example, a cell phone 902, a laptop computer 904, or a tablet personal computer 906. User selections may be input by the user or other users, via one of the aforementioned various electronic devices via a web browser application on the user's device.

In accordance with at least one embodiment, the tag associating and searching service 930 may include a graphical user interface 914. The graphical user interface 914 may serve as the back-end component that may be configured to implement the various user interface elements that can be rendered on the user's browser application (e.g., 906) at the user devices. In accordance with at least one embodiment, the graphical user interface 914 may be configured to implement one or more user interface elements to enable users on devices 902, 904 and 906 to interact with the electronic marketplace website while searching for, browsing, or purchasing items via the electronic marketplace 910. As an example, a user may utilize a user interface element to submit a search query to the electronic marketplace. The user may utilize the user interface to view search results related to a query, various categories of information related to the query, and the like. The search query may be received by the communications manager 924 and stored in the query database 940.

In accordance with at least one embodiment, the tag associating and searching service 930 may include a browsable electronic catalog 916 that is accessible over the network 908 to the users of user devices 902, 904 and 906, via the electronic marketplace website. The electronic catalog 916 may include a database of information about items that may be listed by users within the electronic marketplace system. The information may typically include item IDs, item descriptions and item images provided by manufacturers or distributors of the items. In some examples, information about the items listed in the electronic marketplace system may be viewable by the users of user devices 902, 904 and 906 by browsing the electronic catalog 916 wherein each item may fully be identified within a corresponding item detail page.

In some embodiments, the tag associating and searching service 930 may include a tag associating module 918. The tag associating module 918 may be configured to associate item listings (e.g. from electronic catalog 916) with one or more tag identifiers as discussed herein. Information related to such associations may be stored in the electronic catalog and/or in a separate associative database 946, which may include, for example, records of previously associated tag identifiers, search indexes, etc.

In one embodiment, the tag associating module 918 may be configured to reference available information and update associations, e.g. to increase and/or decrease the affinity, rank, etc. of items and tag identifiers.

In accordance with at least one embodiment, the tag associating and searching service 930 may include a general search engine module 920. In some examples, the general search engine module 920 may be configured to perform text searches on a first data set, such as an entire corpus of information objects accessible by the tag associating and searching service 930, whereas one or more of the tag identifiers may be associated with some predetermined subset thereof (e.g. via a tailored search index). Accordingly, in some examples, the use of the tag search engine module 922 may allow for more efficient and relevant searches to be performed, compared to the general search engine module 920.

In certain embodiments, the tag associating and searching service 930 may include a tag search engine module 922. In some embodiments, the tag search engine module 922 may be configured to maintain, implement and modify a plurality of search engines with associated indices and/or ranking algorithms associated with one or more tag identifiers.

In accordance with at least some embodiments, the tag search engine module 922 may be configured to dynamically modify the associations between items and tag identifiers, e.g. based on the results of individual purchase, reviews and/or searches, as well as based on information obtained from other sources. Alternatively, or in addition to such modifications, the tag search engine module 922 may be configured to modify ranking algorithms associated with one or more of the tag identifiers based on the aggregated results of similar purchases, reviews and/or searches.

Figure 10:
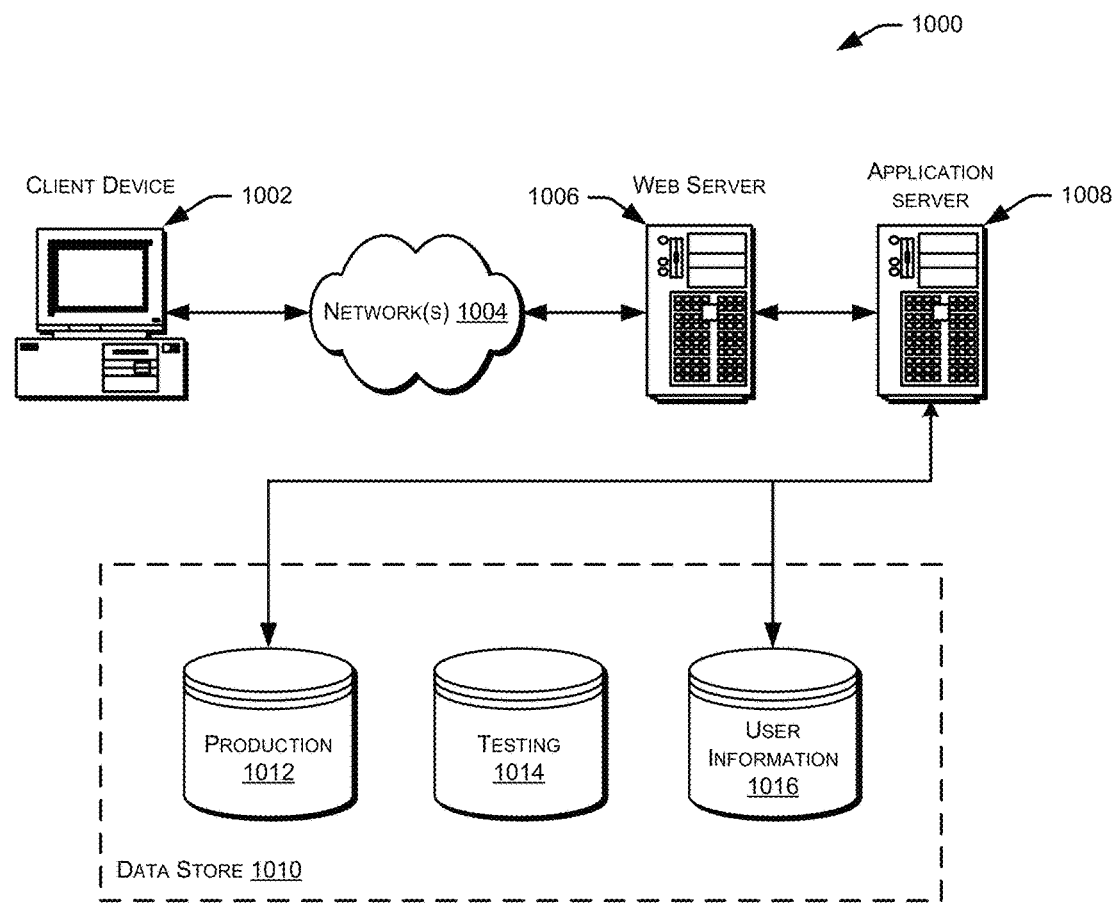
FIG. 10 illustrates an example architecture for implementing searches as described herein, according to at least one other example.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other purposes such as those described herein. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information.

The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, DVD or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents cited herein are hereby incorporated by reference to the same extent as if each reference were individually and specifically indicated to be incorporated by reference and were set forth in its entirety herein.

What is claimed is:

1. A system, comprising:
   a memory that stores computer-executable instructions; and
   a processor configured to access the memory and execute the computer-executable instructions to collectively at least:
       during a browsing session associated with a first computing device, initiate presentation of an item via a first interface of the first computing device;
       transmit a prompt to the first computing device about a query regarding the item;
       receive, from the first computing device, a first response to the question regarding the item;
       determine one or more possible tag identifiers to associate with the item based at least in part on the first response;
       receive, from the first computing device, a second response indicating that the one or more possible tag identifiers should be associated with the item;
       store, in a data store, a record associating the item with one or more of the possible tag identifiers that the second response indicates should be associated with the item;
       receive a search request from a second computing device, the search request including a search identifier;
       search the data store based at least in part on the search request;
       rank any of the one or more tag identifiers associated with the item based at least in part on metadata associated with the one or more tag identifiers; and
       provide a response to the second computing device based at least in part on said search, the response including computer code instructions for requesting the item using the search identifier and any of the one or more tag identifiers that have been associated with the item, the search identifier corresponding to any of the one or more tag identifiers based at least in part on historical data analysis.

2. The system of claim 1, wherein the tag identifiers and the search identifier all begin with a common non-alphanumeric character.

3. The system of claim 1, wherein the response to the second computing device is further based at least in part on at least one of customer information or social media information that is obtained from a social media site outside of the electronic marketplace.

4. The system of claim 1, further comprising instructions for ranking a plurality of items that are associated with one of the tag identifiers.

5. The system of claim 4, further comprising instructions for modifying the ranking of at least one of the plurality of items based at least in part on one or more of seasonal information, social media information, purchase information, promotional information, regional information or customer information.

6. The system of claim 1, further comprising instructions for providing to the second computing device a plurality of suggested search identifiers, wherein the search request is based at least in part on a selection of the search identifier from among the plurality of suggested search identifiers.

7. The system of claim 6, wherein the plurality of suggested search identifiers are determined based at least in part on a plain language search request from the second computing device.

8. A computer-readable storage device storing computer-executable instructions that, when executed by one or more computer systems, configure the one or more computer systems to perform operations comprising:
   during a browsing session associated with a first computing device, initiate presentation of an item via a first interface of the first computing device;
   transmitting a prompt to the first computing device about a query regarding the item;
   receiving, from the first computing device, a first response to the query regarding the item;
   determining one or more possible tag identifiers to associate with the item based at least in part on the first response;
   receiving, from the first computing device, a second response indicating that the one or more possible tag identifiers should be associated with the item;
   storing, in a data store, one or more records associating one or more of the possible tag identifiers with the item based at least in part on the second response;
   receiving, from a second computing device, a search query including a search identifier;
   searching the data store based at least in part on the search query;
   ranking any of the one or more tag identifiers associated with the item based at least in part on metadata associated with the one or more tag identifiers; and
   providing, to the second computing device, a recommendation in response to the search query including computer code instructions for requesting the item using the search identifier and any of the one or more tag identifiers that have been associated with the item, the search identifier corresponding to any of the one or more tag identifiers based at least in part on historical data analysis.

9. The computer-readable storage device of claim 8, wherein providing the recommendation is further based at least in part on said ranking.

10. The computer-readable storage device of claim 8, further comprising instructions for modifying the ranking based at least in part on whether the recommendation is accepted.

11. The computer-readable storage device of claim 8, wherein providing the recommendation is further based at least in part on user information associated with a user submitting the search query.

12. The system of claim 1, wherein the tag identifiers include a hashtag.

* * * * *